United States Patent Office 3,655,723
Patented Apr. 11, 1972

3,655,723
HYDROCYANATION OF OLEFINS
William Charles Drinkard, Jr., Wilmington, Del., assignor to E. I. du Pont de Nemours and Company, Wilmington, Del.
No Drawing. Filed Oct. 31, 1969, Ser. No. 873,063
Int. Cl. C07c 121/04
U.S. Cl. 260—465.3
10 Claims

ABSTRACT OF THE DISCLOSURE

An improved process for hydrocyanating an unsaturated organic compound having at least one aliphatic carbon-carbon double bond in the presence of a complex of a metal such as nickel, cobalt, palladium, iron, tungsten, or molybdenum wherein a cyanohydrin is employed as the source of hydrogen cyanide.

BACKGROUND OF THE INVENTION

The hydrocyanation of a number of olefinic compounds is described in several pending patent applications. A process employing a nickel complex as catalyst is described in Ser. No. 509,432, filed on Jan. 5, 1966, by W. C. Drinkard, Jr. and R. V. Lindsey; in Ser. No. 679,564, filed on Nov. 17, 1967 by W. C. Drinkard, Jr.; in Ser. No. 640,497 filed on June 13, 1967 by W. C. Drinkard, Jr. and R. J. Kassal; and in Ser. No. 832,435, filed on July 11, 1969 by Chia, W. C. Drinkard, Jr. and E. N. Squire. The use of a cobalt complex as catalyst is described in Ser. No. 771,313, filed on Dec. 6, 1968 by W. C. Drinkard, Jr. and B. W. Taylor. The use of a palladium complex is described in Ser. No. 679,608, filed Nov. 1, 1967, by W. C. Drinkard, Jr. and B. W. Taylor. The use of iron or molybdenum as a catalyst complex is described in Ser. No. 680,993, filed on Nov. 22, 1967 by W. C. Drinkard, Jr. and B. W. Taylor.

The processes described in these applications are capable of producing nitriles or dinitriles from olefins in high yield under mild conditions with minimal formation of polymer. There are some difficulties associated with these processes, particularly in respect to the handling of hydrogen cyanide. As is well known, this agent is highly poisonous and is gaseous at a temperature slightly above room temperature. Also, care must be exercised to avoid decomposition or polymerization of the hydrogen cyanide.

SUMMARY OF THE INVENTION

This invention provides an improved process for the hydrocyanation of olefinic compounds in the presence of a metal compound by providing a cyanohydrin as the source of hydrogen cyanide.

The process of the present invention is generally applicable to unsaturated compounds of from 2–20 carbon atoms having at least one aliphatic carbon-carbon double bond. Suitable unsaturated compounds include monoolefins, diolefins, and monoolefins substituted with groups which do not attack the catalyst such as cyano, aldehyde, ester or ketone. Typical monoolefins include ethylene, propylene, butene-1, pentene-2, hexene-2, etc. Substituted monoolefinis include styrene, 3-pentenenitrile and 4-pentenenitrile. Typical diolefins include butadiene, piperylene and isoprene. Especially preferred among these are butadeinne, 3-pentenenitrile, 4-pentenenitrile and 2-methyl-3-butenenitrile.

A typical illustration of the process of this invention is the hydrocyanation of an unsaturated compound such as butadiene with a cyanohydrin in the presence of a suitable metal complex leading to the formation of 3-pentenenitrile and 2-methyl-3-butenenitrile. The 2-methyl-3-butenenitrile on further hyrocyanation is converted to 2-methylglutaronitrile. The 3-pentenenitrile on further hydrocyanation yields adiponitrile generally along with some 2-methylglutaronitrile.

The hydrocyanation reaction can be carried out in the presence of simple compounds of metals such as cuprous halides or complexes of the metals such as those of nickel, cobalt, palladium, iron, tungsten, or molybdenum. The complexes have the general formula $[L_nMX_m]_b$ wherein M is nickel, cobalt, palladium, iron, tungsten or molybdenum, L is a sigma-pi bonding neutral ligand of the group consisting of CO and $PZ_3$ where Z is R or OR and R is an alkyl or aryl group having up to 18 carbon atoms and wherein the R group in a given $PZ_3$ may be the same or different, and may be cojoined, X is halide or CN, wherein $b$ has a numerical value of 1 to 3; wherein $n$ has a numerical value of from 3 to 4 and $m$ is $4-n$ when M is Ni, Co or Pd; $n$ is 6 and $m$ is 0 when M is Mo, or W; and $n$ has a numerical value from 2 to 5 and the sum of $n$ and $m$ is a value of 4 to 5 when M is Fe.

The ligands useful as L may be defined as any atom or molecule capable of functioning as a sigma-pi bonded partner in one or more coordinate bonds. A description of such ligands may be found in Advanced Inorganic Chemistry by F. Albert Cotton and G. Wilkinson, published by Interscience Publishers, a division of John Wiley & Sons, 1962, Library of Congress Catalogue Card No. 62–14818; particularly on pages 602–606.

The ligands (L) referred to above are considered to be monofunctional in the sence that they occupy only one coordination position on the central metal atom. Other ligands such as acrylonitrile, cyclopentadienyl ion and acetylacetonato ion, referred to in the subsequent description, are considered to be polyfunctional in that they can occupy more than one coordination position on the central metal atom.

Compounds of nickel which are useful in the present invention include such complexes as $Ni[P(OC_2H_5)_3]_4$, $Ni[P(OC_4H_9)_3]_4$, $Ni[P(O—iC_3H_7)_3]_4$, $Ni[P(OC_6H_5)_3]_4$, $Ni[P(C_6H_5)_3]_4$, $Ni[P(O—C_6H_4CH_3)_3]_4$ and $$Ni[P(OCH_3)_3]_4$$

The nickel complexes may be prepared prior to use or they may be prepared in situ. There are several techniques for in situ preparation of the complex. For example, nickel carbonyl and a triaryl or trialkyl phosphite or phosphine can be added to the reaction mixture. A second technique involves adding the triaryl or trialkyl phosphite or phosphine, a nickel (II) compound such as a nickel halide, e.g., $NiCl_2$, $Ni(CN)_2$ or bis-(acetylacetonato) nickel and a reducing agent such as an active metal such as zinc or a source of hydride ions, such as compounds of the structure $M'BH_4$, $M'AlH_4$, and $M'H_x$ where $M'$ is an alkali or an alkaline earth metal and $x$ is a number corresponding to the valence of the metal. A third technique is to add an organonickel compound such as dicyclopentadienyl nickel or nickel-olefin complex such as bis-acrylonitrile nickel to the triaryl phosphite or phosphine. The term organonickel is intended to mean a compound containing a C to Ni bond.

The cobalt complexes for the hydrocyanation step are those wherein at least some of the cobalt is believed to have a valence of +1. Such complexes can readily be prepared from a conventional cobalt compound wherein the cobalt has a valence of —1, such as in

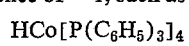

or $HCo[P(OC_6H_5)_3]_4$; 0, such as in

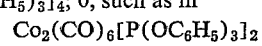

or +2, such as in $CoCl_2$, by treating such a compound with an appropriate amount of an oxidizing or reducing agent so as to bring the average or effective valence of cobalt below +2, generally to within the range of +0.25 to +1.75, and preferably within the range of +0.75 to +1.25. The cobalt may be supplied to the system in many forms including coordination compounds of cobalt or salts of cobalt. Suitable coordination compounds may contain the low valent cobalt in conjunction with a sigma-pi bonding ligand. The compound is then oxidized by a convenient means such as with ferric chloride to form a catalyst believed to be of the structure L₃MX wherein M is cobalt, X is an anion and L is a neutral ligand.

In the case where the cobalt is supplied to the system as a salt or as a +2 or +3 valent complex, it is generally necessary to utilize a reducing agent. Convenient reducing agents to use are metals which are sufficiently electronegative to reduce cobalt to $Co^{+1}$. Suitable cobalt compounds generally are the salts of the mineral acids and lower fatty acids, organic sulfonic acids and fluoroboric acid and complexes of acetylacetone or salicylaldehyde. Of these the halides, particularly the chlorides, bromides and iodides are preferred because of their availability and simplicity of use.

Typical palladium complexes such as $Pd[P(OC_6H_5)_3]_4$ likewise are preferably prepared prior to use. However, these complexes can also be prepared in situ by any of several methods previously described for nickel such as by adding a divalent palladium compound such as a palladium halide, palladium acetylacetonate or palladium acetate, a compound of the formula $PZ_3$ where Z has the meaning defined above and a reducing agent such as $Al(CH_2CH_3)_3$, zinc metal, iron, aluminum, magnesium, hydrazine or sodium borohydride.

The molybdenum and tungsten compounds, of the type $(Z_3P)_3M(CO)_3$, where M is Mo or W, are prepared by heating a compound of the formula $M(CO)_6$ in the presence of a compound of the formula $PZ_3$, wherein Z has the meaning defined previously, at a moderately elevated temperature such as 150° C.

The copper systems are particularly useful for hydrocyanating conjugated diolefins. The copper compound such as cuprous chloride, bromide or iodide may be used alone or in conjunction with agents such as crotyl chloride or hydrogen chloride.

The compounds based on iron, such as the iron carbonyls, are prepared by passage of carbon monoxide over the finely-divided metal at an elevated temperature and pressure. The preparation of iron pentacarbonyl, for example, employs a pressure of 20 to 200 atmospheres and a temperature of 200° C.

The hydrocyanation reaction can be carried out with or without a solvent. The solvent should be a liquid at the reaction temperature and pressure and inert toward the unsaturated compound and the metal complex. Generally, such solvents are hydrocarbons such as benzene, toluene or xylene, or nitriles such as acetonitrile, benzonitrile, or adiponitrile.

The exact temperature used is dependent to a certain extent on the particular complex and the particular unsaturated compound being used and the desired rate. Generally, temperatures of from —25° C. to 200° C. can be used with from 0° C. to 150° C. being the preferred range for hydrocyanation. The reactions may be carried out at atmospheric pressure or at a pressure above or below atmospheric depending upon the particular reactants being employed.

The cyanohydrin to be used as the source of hydrogen cyanide can be derived from almost any aldehyde or ketone. Suitable ketones include acetone, diethylketone, methylbutylketone, cyclododecanone, and cyclohexanone. Aldehydes from which appropriate cyanohydrins can be derived include formaldehyde, acetaldehyde, propionaldehyde, butyraldehyde, benzaldehyde and furfuraldehyde. The amount of cyanohydrin employed may be the stoichiometric amount, or a deficiency or excess may be used depending on the particular circumstances involved.

In carrying out the hydrocyanation reaction the reactor may be charged with all of the reactants. Thus, the reactor is charged with the catalyst or catalyst components, the unsaturated compound, the solvent, and the particular cyanohydrin to be employed. Alternately, the cyanohydrin can be introduced into the reactor containing the other reactants or the cyanohydrin and the unsaturated organic compound may be fed together into reaction medium. The molar ratio of unsaturated compound to catalyst generally is varied from about 10:1 to 2000:1 for a batch operation. In a continuous operation such as when using a fixed bed catalyst type of operation, a much higher proportion of catalyst may be used such as 1:2 unsaturated compound to catalyst.

Optionally, a promoter may be used to activate the catalyst for the hydrocyanation reaction, particularly for reactions carried out in the presence of nickel, cobalt and palladium compounds. The promoter generally is a boron compound or a cationic form of the metal selected from the class consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, thorium, iron, and cobalt. Among these, the cations of zinc, cadmium, titanium, tin, chromium, iron and cobalt are preferred. Suitable promoters of this type are salts of the metals listed above and include aluminum chloride, zinc chloride, cadmium iodide, titanium trichloride, titanium tetrachloride, zinc acetate, ethyl aluminum dichloride, chromic chloride, stannous chloride, zinc iodide, nickel chloride, cerous chloride, cobaltous iodide, cadmium chloride, molybdenum dichloride, zirconium chloride, thorium chloride, ferrous chloride, and cobaltous chloride.

The boron compounds are borohydrides or organoboron compounds, of which the organoboron compounds of the structure $B(R')_3$ are preferred. The borohydrides are the alkaline metal borohydrides, such as sodium borohydride and potassium borohydride, and the quaternary ammonium borohydrides, particularly the tetra(lower alkyl)ammonium borohydrides and borohydrides of the formula $B_nH_{n+4}$ where $n$ is an integer of from 2 to 10 and $B_nH_{n+6}$ where $n$ is an integer of from 4 to 10. When the boron compounds have the structure $B(R')_3$, R' is selected from the class consisting of H, aryl radicals of from 6 to 18 carbon atoms, lower alkyl radicals of from 1 to 7 carbon atoms, and lower alkyl radicals of from 1 to 7 carbon atoms substituted with a cyano radical. Generally, the case where R' is phenyl, as in triphenylborane, or phenyl substituted with an electro-negative radical is preferred.

If desired, an excess of ligand such as an aryl phosphite or an aryl phosphine over that required for the metal complex may be employed. The molar ratio of the excess ligand to the metal complex is at least 2:1 and preferably at least 8:1.

For recovery of the hydrocyanation products, conventional techniques may be employed such as crystallization of the product from solution or distillation.

The nitriles formed by the present invention are useful as chemical intermediates. For example, adiponitrile is an intermediate used in the production of hexamethylenediamine which is used in the production of polyhexamethyleneadipamide, a commercial polyamide, useful in forming fibers, films, and molded articles. Other nitriles can be converted to the corresponding acids and amines which are conventional commercial products.

DESCRIPTION OF THE PREFERRED EMBODIMENTS

Nickel complexes

Hydrocyanation reaction of olefins with a cyanohydrin in the presence of nickel complexes is illustrated in Examples 1 to 39. In Examples 1 to 26, which are summarized in Table I, the reactions are carried out in a 50 ml. three-necked, round bottom glass flask fitted with a thermometer, magnetic stirrer, inlet tube above liquid level and a water-cooled condenser connected to a "Dry Ice" trap. The flask is heated by an oil bath. The system is purged with nitrogen and reagents are charged. After further nitrogen purge of the closed system, the mixture is heated to operating temperature. At the end of the run, the mixture is cooled and the product is analyzed by gas chromatography.

In the several tables the following designations are used:

I—3-pentenenitrile
II—2-methyl-3-butenenitrile
III—2-acetyl-5-norbornene
IV—Methyl 5-norbornene-2-carboxylate
A—Adiponitrile
B—2-methylglutaronitrile
C—Ethylsuccinonitrile
D—Trans-3-pentenenitrile
E—2-methyl-3-butenenitrile
F—Trans-2-pentenenitrile
G—Cis-3-pentenenitrile
(a)—Acetylacetonato ion
(b)—Cyclopentadienyl ion

TABLE I.—HYDROCYANATION WITH NICKEL COMPLEXES

| Example | Complex | | Olefin | Cyanohydrin | Reaction Temperature, °C | Time, hrs. | Products, percent |
|---|---|---|---|---|---|---|---|
| 1 | $Ni[P(OC_2H_5)_3]_4$ | 1.6 g | I, 20 g | Acetone, 5.0 g | 60 | 22 | A, 0.201. B, 0.202. |
| 2 | $Ni[P(O-C_6H_4-CH_3)_3]_4$ | 0.8 g | I, 25 ml | Acetone, 5.0 ml | 80 | 22 | A, 10.3 |
|   | $ZnCl_2$ | 0.2 g | | | | | B, 2.1. |
|   | $P(O-C_6H_3(C_9H_{19}))_3$ | 10.0 ml | | | | | C, 0.22. |
| 3 | $Ni[P(O-C_6H_4-CH_3)_3]_4$ | 0.8 g | I, 25 ml | Acetone, 5.0 ml | 80 | 22 | A, 0.252. |
|   | $TiCl_3$ | 0.1 g | | | | | B, 0.226. |
|   | $P(O-C_6H_4-CH_3)_3$ | 1.4 ml | | | | | |
| 4 | $Ni[P(O-C_6H_4-CH_3)_3]_4$ | 0.8 g | I, 25 ml | Acetone, 5.0 ml | 80 | 22 | A, 3.85. B, 1.17. |
|   | $CoI_2$ | 0.2 g | | | | | |
|   | $P(O-C_6H_4-CH_3)_3$ | 1.4 ml | | | | | |
| 5 | $Ni[P(O-C_6H_4-CH_3)_3]_4$ | 0.8 g | I, 25 ml | Acetone, 5.0 ml | 80 | 22 | A, 7.08. |
|   | $ZnBr_2$ | 0.2 g | | | | | B, 1.81. |
|   | $P(O-C_6H_4-CH_3)_3$ | 1.4 ml | | | | | |
| 6 | $Ni[P(O-C_6H_4-CH_3)_3]_4$ | 0.8 g | I, 25 ml | Acetone, 5.0 ml | 80 | 20 | A, 0.54. |
|   | $CdCl_2$ | 0.2 g | | | | | B, 0.30. |
|   | $P(O-C_6H_4-CH_3)_3$ | 1.4 ml | | | | | |
| 7 | $Ni[P(O-C_6H_4-CH_3)_3]_4$ | 0.8 g | I, 25 ml | Acetone, 10 g | 60 | 20 | A, 3.84. |
|   | $B(C_6H_5)_3$ | 0.24 g | | | | | B, 0.28. |
|   | $P(O-C_6H_4-CH_3)_3$ | 1.4 ml | | | | | |
| 8 | $Ni[P(O-C_6H_4-CH_3)_3]_4$ | 0.8 g | I, 25 ml | Acetone, 10 g | 60 | 20 | A, 2.95. |
|   | $CoCl_2$ | 0.07 g | | | | | B, 0.90. |
|   | $P(O-C_6H_4-CH_3)_3$ | 1.4 ml | | | | | |
| 9 | $Ni[P(O-C_6H_4-CH_3)_3]_4$ | 0.8 g | I, 25 ml | Acetone, 10 g | 60 | 20 | A, 0.34. |
|   | $SnCl_2$ | 0.1 g | | | | | B, 0.22. |
|   | $P(O-C_6H_4-CH_3)_3$ | 1.4 ml | | | | | |

TABLE I.—Continued

| Example | Complex | | Olefin | Cyanohydrin | Reaction Temperature, °C. | Time, hrs. | Products, percent |
|---|---|---|---|---|---|---|---|
| 10 | Ni[P(O-C₆H₄-CH₃)₃]₄<br>ZnCl₂<br>P(O-C₆H₄-CH₃)₃ | 0.8 g<br>0.08 g<br>1.4 ml | I, 25 ml | Acetone, 10 g | 80 | 22 | A, 3.62.<br>B, 1.05. |
| 11 | Ni[P(OC₆H₅)₃]₄ | 2.0 g | I, 25 ml | Acetone, 10 g | 80 | 22 | A, 0.58.<br>B, 0.20. |
| 12 | Ni[P(O-C₆H₄-CH₃)₃]₄<br>ZnCl₂<br>P(O-C₆H₄-CH₃)₃ | 0.8 g<br>0.1 g<br>1.4 ml | II, 25 ml | Acetone, 10 ml | 80 | 20 | B, 11.703. |
| 13 | Ni[P(OC₆H₅)₃]₄<br>ZnCl₂<br>P(OC₆H₅)₃ | 1.6 g<br>0.08 g<br>2.8 g | I, 20 g | Benzaldehyde, 3 g | 80 | 22 | A, 0.84.<br>B, 0.27. |
| 14 | Ni[P(OC₆H₅)₃]₄<br>ZnCl₂<br>P(OC₆H₅)₃ | 1.6 g<br>0.16 g<br>2.8 g | I, 20 g | Benzaldehyde, 3 g | 60 | 22 | A, 0.28.<br>B, 0.19. |
| 15 | Ni[P(C₆H₅)₃]₄<br>ZnCl₂<br>P(C₆H₅)₃ | 1.6 g<br>0.26 g<br>0.5 g | II, 25 ml | Acetone, 5 ml | 60 | 21.5 | B, 16.778. |
| 16 | Ni[P(C₆H₅)₃]₄<br>ZnCl₂ | 1.6 g<br>0.26 g | II, 25 ml | Acetone, 5 ml | 60 | 21.5 | B, 8.4888. |
| 17 | Ni[P(O-C₆H₄-CH₃)₃]₄<br>ZnCl₂ | 2.0 g<br>0.2 g | I, 25 ml | Cyclohexanone, 10 ml | 80 | 23 | A, 12.71.<br>B, 2.12. |
| 18 | Ni(C₅H₇O₂)₂ª<br>Zn<br>P(O-C₆H₄-C₉H₁₉)₃ | 1.78 g<br>0.4 g<br>20 ml | I, 25 ml | Acetone 5 g | 100 | 17.5 | A, 6.06. |
| 19 | Ni(C₅H₅)₂ᵇ<br>ZnCl₂<br>P(O-C₆H₄-C₉H₁₉)₃ | 1.0 g<br>0.7 g<br>20 ml | I, 25 ml | Acetone, 5 g | 100 | 17.5 | A, 2.43. |
| 20 | Ni(CH₂=CH-CN)₂<br>ZnCl₂<br>P(OC₆H₅)₃ | 0.8 g<br>0.6 g<br>6.2 g | I, 25 ml | Acetone, 5 g | 100 | 17.5 | A, 1.89.<br>B, 1.73. |
| 21 | Ni(C₅H₇O₂)₂ª<br>Zn<br>P(O-C₆H₄-C₉H₁₉)₃ | 1.78 g<br>0.4 g<br>20 ml | I, 25 ml | Acetone, 5 g | 100 | 21 | A, 5.14.<br>B, 0.20. |
| 22 | Ni(C₅H₅)₂ᵇ<br>ZnCl₂<br>P(O-C₆H₄-C₉H₁₉)₃ | 1.0 g<br>0.7 g<br>20 ml | I, 25 ml | Acetone 5 g | 100 | 21 | A, 15.47.<br>B, 3.13.<br>C, 0.30. |
| 23 | Ni[P(C₆H₅)₃]₃<br>ZnCl₂<br>P(C₆H₅)₃ | 1.6 g<br>0.26 g<br>0.5 g | I, 20 g | Acetone, 5 g | 60 | 21.5 | A, 2.713.<br>B, 0.802. |
| 24 | Ni[P(C₆H₅)₃]₃<br>ZnCl₂<br>P(C₆H₅)₃ | 1.6 g<br>0.26 g<br>0.5 g | I, 20 g | Acetone, 5 g | 80 | 21.5 | A, 1.329.<br>B, 0.593 |
| 25 | Ni[P(OC₆H₄CH₃)₃]₄ | 0.8 g | I, 20 g | Cyclohexanone, 5 ml | 80 | 22 | A, 4.02. |
| 26 | ZnCl₂<br>P(O-C₆H₄-CH₃)₃ | 0.2 g<br>5 ml | | | | | B, 0.7. |
| 27 | NiCl₂<br>Zn<br>P(C₆H₅)₃ | 0.6 g<br>0.65 g<br>5.2 g | I, 20 g | Cyclododecanone, 2.0 g | 60 | 18.5 | A, 0.014.<br>B, 0.007. |

Example 28

In a nitrogen atmosphere a precooled 400 ml. stainless steel pressure tube is charged with 5.0 g. of Ni[P(OC₆H₅)₃]₄, 20 ml. of allene and 10 ml. of acetone cyanohydrin. The mixture is maintained at 100° C. for 8 hours. Hydrocyanation is shown to have occurred by comparison of product gas chromatography retention time with that of a known standard of allylcyanide.

Example 29

A reaction flask is charged with 0.8 g. of Ni[P(OC$_6$H$_5$)$_3$]$_4$, 0.8 g. of ZnCl$_2$, 10 ml. of methyl 5-norbornene-2-carboxylate and 5 ml. of acetone cyanohydrin. The mixture is maintained at 80° C. for 21 hours. Hydrocyanation is shown to have occurred by comparison of product gas chromatography retention time with that of a known standard. Structures of the product are:

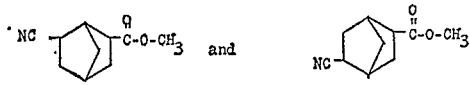

Example 30

A reaction flask is charged with 0.8 g. of Ni[P(OC$_6$H$_5$)$_3$]$_4$, 0.08 g. of ZnCl$_2$, 20 ml. of dicyclopentadiene, and 5 ml. of acetone cyanohydrin. The mixture is maintained at 80° C. for 21 hours. Hydrocyanation is shown to have occurred by comparison of product gas chromatography retention time with that of a known sample. Structures of the products are:

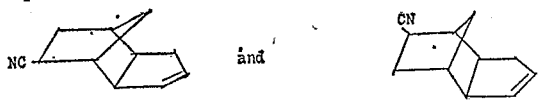

Example 31

A reaction flask is charged with 0.8 g. of Ni[P(OC$_6$H$_5$)$_3$]$_4$, 0.08 g. of ZnCl$_2$, 10 ml. of 2-acetyl-5-norbornene and 5 ml. of acetone cyanohydrin. The mixture is maintained at 80 C. for 20 hours. Hydrocyanation is shown to have occurred by comparison of product gas chromatography retention time with that of a known sample. Structure of the products are:

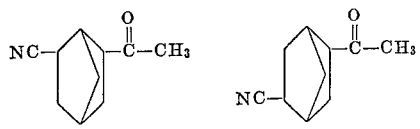

Example 32

In a nitrogen atmosphere, a precooled 400 ml. stainless steel pressure tube is charged with 5.0 g. of Ni[P(OC$_6$H$_5$)$_3$]$_4$, 12.0 g. of P(OC$_6$H$_5$)$_3$, 68 g. of piperylene, and 41 g. of acetone cyanohydrin. The mixture is maintained at 100° C. for 8 hours. Hydrocyanation is shown to have occurred by comparison of product gas chromatography retention time with that of a known standard. The product is

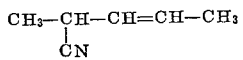

Examples 33–40

In these examples butadiene (87 ml.) is hydrocyanated with acetone cyanohydrin (41 g.) in the presence of the specified metal complex in a 400 ml. stainless steel pressure tube as described in Example 31. The tube is precooled in "Dry Ice," purged with nitrogen, the reactants are introduced under a nitrogen blanket, the tube is further cooled in "Dry Ice," evacuated briefly and sealed. The reaction tube is maintained at 100° C. for 8 hours, cooled, vented and the product recovered and analyzed by gas chromatography. The results are summarized in Table II.

TABLE II

| Example | Complex | | Product, percent |
|---|---|---|---|
| 33 | Ni[P(OC$_6$H$_5$)$_3$]$_4$ | 5.0 g | D, 23.9. |
|  | P(C$_6$H$_5$)$_3$ | 3.0 g | E, 1.7. F, 1.7. G, 1.5. |
| 34 | Ni[P(OC$_6$H$_5$)$_3$]$_4$ | 2.0 g | D, 1.3. |
|  | P(C$_6$H$_5$)$_3$ | 2.0 g | E, 1.0. G, 0.06. |
| 35 | Ni(CO)$_2$[P(C$_6$H$_5$)$_3$]$_2$ | 2.0 g | D, 26.6. E, 11.2. G, 0.3. |
| 36 | Ni[C$_6$H$_5$OP(C$_6$H$_5$)$_2$]$_4$ | 1.86 g | D, 1.2. E, 0.6. |
| 37 | Ni[CH$_3$P(C$_6$H$_5$)$_2$]$_4$ | 1.91 g | D, 5.6. G, 0.06. |
| 38 | Ni[P(OC$_6$H$_5$)$_3$]$_4$ | 5.0 g | D, 10.7. |
|  | P(OC$_6$H$_5$)$_3$ | 5.0 g | E, 5.5. |
| 39 | Ni[P(OC$_6$H$_5$)$_3$]$_4$ | 5.0 g | D, 21.9. |
|  | P(OC$_6$H$_5$)$_3$ | 10 g | E, 11.8. |
| 40 | Ni(CO)[P(OC$_6$H$_5$)$_3$]$_3$ | 5.0 g | D, 5.1. |
|  | P(OC$_6$H$_5$)$_3$ | 10 g | E, 2.6. |

USE OF COBALT COMPLEXES

The hydrocyanation of olefins with a cyanohydrin in the presence of cobalt complexes is illustrated in Examples 41 to 55.

Example 41

In a nitrogen atmosphere, a precooled 400 ml. stainless steel pressure tube is purged with nitrogen and charged with 2.0 g. of Co$_2$(CO)$_8$, 87 ml. of butadiene and 20.0 g. of acetone cyanohydrin. The tube is sealed and the mixture is maintained at 100° C. for 8 hours. Gas chromatographic analysis shows that the crude product contains 5.64% trans-3-pentenenitrile, 2.91% cis 3-pentenenitrile, 5.48% 4-pentenenitrile and 0.40% 2-methyl-3-butenenitrile.

In Examples 42 and 55 (Table III), the reactions are carried out in a 50 ml. three-necked round bottom glass flask fitted with a thermometer, magnetic stirrer, inlet tube above liquid level and a water-cooled condenser connected to a "Dry Ice" trap. The flask is heated by an oil bath. The system is purged with nitrogen and reagents are charged. After further nitrogen purge of the closed system, the mixture is heated to operating temperature. At the end of the run the mixture is cooled and the product analyzed by gas chromatography.

TABLE III.—HYDROCYANATION WITH COBALT COMPLEXES

| Example | Complex | G. | Olefin | Cyanohydrin | Reaction Temperature, °C. | Time, hrs. | Products, percent |
|---|---|---|---|---|---|---|---|
| 42 | Co$_2$(CO)$_8$ | 2.0 | I, 25 ml | Acetone 5 g | 80 | 21 | A, 0.54. B, 11.06. C, 1.01. |
| 43 | Co$_2$(CO)$_8$ | 2.0 | I, 20 g | Acetone 5 g | 80 | 21 | A, 0.537. B, 11.06. C, 1.014. |
| 44 | CoI$_2$ | 3.0 | II 25 ml | Acetone 5 g | 100 | 22 | B, 3.696. |
|  | Fe | 0.84 |  | Acetone 5 g |  |  |  |
|  | P(OC$_6$H$_5$)$_3$ | 12.4 |  | Acetone 5 g |  |  |  |
| 45 | CoI$_2$ | 3.0 | I, 25 ml | Acetone 5 g | 100 | 24 | A, 1.36. |
|  | Fe | 0.84 | I, 25 ml | Acetone 5 g |  |  | B, 0.32. |
|  | P(OC$_6$H$_5$)$_3$ | 12.4 | I, 25 ml | Acetone 5 g |  |  |  |
|  | P(OC$_6$H$_5$)$_3$ | 12.4 | I, 25 ml | Acetone 5 g |  |  |  |
| 46 | CoCl$_2$ | 1.3 | I, 25 ml | Acetone 5 ml | 80 | 24 | A, 3.30. |
|  | Fe | 0.84 | I, 25 ml | Acetone 5 ml |  |  | B, 0.88. |
|  | P(OC$_6$H$_5$)$_3$ | 12.4 | I, 25 ml | Acetone 5 ml |  |  |  |

TABLE III.—Continued

| Example | Complex | G. | Olefin | Cyanohydrin | Reaction Temperature, °C. | Time, hrs. | Products, percent |
|---|---|---|---|---|---|---|---|
| 47 | $CoCl_2$ | 1.3 | I, 25 ml | Acetone 5 ml | 100 | 22 | A, 1.04. |
| | Mn | 0.5 | I, 25 ml | Acetone 5 ml | | | B, 0.79. |
| | $P(OC_6H_5)_3$ | 0.2 | I, 25 ml | Acetone 5 ml | | | |
| 48 | $CoCl_2$ | 1.3 | I, 25 ml | Acetone 5 ml | 100 | 24 | A, 0.52. |
| | Zn | 0.33 | I, 25 ml | Acetone 5 ml | | | B, 0.22. |
| | $P(OC_6H_5)_3$ | 12.4 | I, 25 ml | Acetone 5 ml | | | |
| 49 | $CoBr_2$ | 2.2 | I, 25 ml | Acetone 5 ml | 100 | 24 | A, 1.76. |
| | Fe | 0.84 | I, 25 ml | Acetone 5 ml | | | B, 0.58. |
| | $P(OC_6H_5)_3$ | 12.4 | I, 25 ml | Acetone 5 ml | | | |
| 50 | $HCo[P(OC_6H_5)_3]_4$ | 1.3 | I, 20 g | Acetone, 5.0 g | 100 | 22 | A, 0.664. |
| | $CoI_2$ | 3.0 | | | | | |
| | $P(OC_6H_5)_3$ | 12.4 | | | | | |
| 51 | $Co_2(CO)_8$* | 0.9 | III, 10 ml | Acetone, 2.5 ml | 80 | 22 | Hydrocyanated product obtained. |
| 52 | $Co_2(CO)_8$ | 1.7 | III, 10 ml | Acetone, 2.5 ml | 80 | 23.5 | Hydrocyanated product obtained. |
| 53 | $Co_2(CO)_8$* | 0.9 | IV, 10 ml | Acetone, 2.5 ml | 80 | 22 | Hydrocyanated product obtained. |
| 54 | $Co_2(CO)_8$ | 1.7 | IV, 10 ml | Acetone, 2.5 ml | 80 | 23.5 | Hydrocyanated product obtained. |
| 55 | $CoCl_2$ | 1.3 | I, 20 g | Cyclohexanone, 5 ml | 80 | 22 | A, 2.08. |
| | Fe | 0.84 | | | | | B, 0.62. |
| | $P(OC_6H_5)_3$ | 12.4 | | | | | |

* In 10 ml. toluene.

HYDROCYANATION WITH PALLADIUM COMPLEXES

The hydrocyanation of olefins with a cyanohydrin in the presence of palladium complexes is illustrated in Examples 56 to 61 (Table IV). The reactions are carried out as described for Examples 42 to 55.

HYDROCYANATION WITH COMPLEXES BASED ON IRON, COPPER OR TUNGSTEN

These hydrocyanations with a cyanohydrin as the source of hydrogen cyanide are illustrated in Examples 67 to 74.

TABLE IV.—HYDROCYANATION WITH PALLADIUM COMPLEXES

| Example | Complex | Olefin | Cyanohydrin | Reaction Temperature °C. | Time, hrs. | Products, percent |
|---|---|---|---|---|---|---|
| 56 | $Pd[P(OC_6H_5)_3]_4$ | 2.0 g.. I, 25 ml | Acetone, 5 g | 100 | 18 | A, 1.33. B, 0.58. |
| 57 | $Pd[P(OC_6H_5)_3]_4$ | 2.0 g.. I, 25 ml | Acetone, 5 g | 100 | 18 | A, 12.38. B, 6.33. C, 0.808. |
| | $ZnBr_2$ | 0.2 g | | | | |
| 58 | $Pd[P(OC_6H_5)_3]_4$ | 2.0 g.. I, 25 ml | Acetone, 5 g | 100 | 18 | A, 1.11. B, 0.60. |
| | $B(C_6H_5)_3$ | 0.2 g | | | | |
| 59 | $Pd[P(OC_6H_5)_3]_4$ | 2.0 g.. I, 20 g | Acetone, 5 g | 100 | 22 | A, 0.397. B, 0.181. |
| | $P(OC_6H_5)_3$ | 6.0 g | | | | |
| 60 | $Pd[P(OC_6H_5)_3]_4$ | 2.0 g.. IV, 10 ml | Acetone, 5 g | 80 | 20.5 | Hydrocyanated product obtained. |
| 61 | $PdCl_2$ | 0.18 g. I, 20 g | Cyclohexanone, 5 ml | 100 | 22 | A, 0.96. B, 0.48. |
| | $Al(C_2H_5)_3$* | 2.0 ml | | | | |
| | $P(OC_6H_5)_3$ | 10 g | | | | |

* 2 m. in $C_6H_6$.

HYDROCYANATION WITH MOLYBDENUM COMPLEXES

Hydrocyanation with molybdenum complexes is illustrated in Examples 62 to 66 (Table V). The reactions are carried out as described for Examples 42 to 55.

Example 67

A 400 ml. stainless steeel pressure tube is precooled in "Dry Ice," purged with nitrogen and charged with 87 ml. of liquid butadiene, 41 g. of acetone cyanohydrin and 4 ml. of $Fe(CO)_5$. The charged tube is further cooled in

TABLE V.—HYDROCYANATION WITH MOLYBDENUM COMPLEXES

| Example | Complex | G. | Olefin | Cyanohydrin | Reaction Temperature, °C. | Time, hrs. | Products, percent |
|---|---|---|---|---|---|---|---|
| 62 | $Mo(CO)_6$ | 2.6 | I, 25 ml | Acetone, 5 g | 100 | 20 | A, 0.46. |
| | $I_2$ | 1.25 | | | | | |
| 63 | $Mo(CO)_6$ | 2.6 | I, 25 ml | Acetone, 5 g | 100 | 20 | A, 0.43. |
| | $MoCl_5$ | 0.9 | | | | | B, 0.22. |
| 64 | $Mo(CO)_6$ | 2.6 | I, 25 ml | Acetone, 5 g | 100 | 20 | A, 1.04. |
| | $Fe(C_5H_7O_2)_3$a | 3.1 | | | | | B, 0.68. |
| 65 | $Mo(CO)_6$ | 2.6 | II, 25 ml | Acetone, 5 g | 100 | 22.5 | B, 1.745. |
| | $Fe(C_5H_7O_2)_3$a | 3.1 | | | | | |
| 66 | $Mo(CO)_6$ | 2.6 | I, 20 g | Cyclohexanone, 5 ml | 100 | 22 | A, 0.61. B, 0.27. C, 0.27. |
| | $Fe(C_5H_7O_2)_3$a | 3.1 | | | | | |

"Dry Ice," evacuated briefly and sealed. The reaction tube is maintained at 60° C. for 8 hours, cooled, vented and the product recovered. Chromatographic analysis shows the crude product to contain 0.8% of trans-3-pentenenitrile.

Example 68

Following the procedure of Example 67 but with a complex comprising 10 g. of CuCl and 2.0 g. of crotyl chloride and with the reaction held at 100° C. for 8 hours, the crude product contains 29.90% of trans-3-pentenenitrile and 1.834% of 2-methyl-3-butenenitrile.

Example 69

Following the procedure of Example 68, the pressure tube is charged with 10 g. of CuCl, 2.0 g. of crotyl chloride, 68 g. of piperylene and 41 g. of acetone cyanohydrin. Hydrocyanation is shown to have occurred by comparison of product gas chromatography retention time with that of a known standard. The structure of the product is

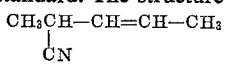

Example 70

In the following the procedure of Example 67 except for use of CuBr in place of Fe(CO)$_5$ and carrying out the reaction at 120° C. for 8 hours, the product is found to contain 26.2% of trans-3-pentenenitrile, 2.8% of 2-methyl-3-butenenitrile and 1.7% cis-3-pentenenitrile.

Example 71

In following the procedure of Example 67 except for use of CuCl in place of Fe(CO)$_5$ and carrying out the reaction at 120° C. for 8 hours, the crude product is found to contain 33.8% of trans-3-pentenenitrile, 2.4% of 2-methyl-3-butenenitrile, 0.6% of trans - 2 - pentenenitrile and 2.6% of cis-3-pentenenitrile.

Example 72

In following the procedure of Example 71 except for addition of 2.0 g. of CuCl to the system and carrying out the reaction at 100° C. for 8 hours, the crude product is found to contain 8.8% of trans-3-pentenenitrile, 0.5% of 2-methyl-3-butenenitrile, 0.1% of trans-2-pentenenitrile and 0.6% of cis-3-pentenenitrile.

Example 73

In following the procedure of Example 67 except for use of 3.5 g. of W(CO)$_6$ as the metal complex, the crude product is found to contain 0.1% of 2-methyl-2-butenenitrile.

Example 74

A 50 ml. reaction flask is purged with nitrogen, charged with 3.5 g. of W(CO)$_6$, 1.4 g. of CuCl$_2$, 25 ml. of 2-methyl-3-butenenitrile and 5.0 g. of acetone cyanohydrin and thereafter maintained at 100° C. for 22.5 hours. Gas chromatographic analysis shows the crude product to contain 0.898% of 2-methylglutaronitrile.

The invention claimed is:

1. In a process of hydrocyanating an ethylenic carbon-carbon double bond of an unsaturated organic compound having from 2 to 20 carbon atoms, the unsaturated organic compound being selected from the group consisting of monoolefins, diolefins and monoolefins substituted with a group of the class consisting of cyano, aldehyde, ester and ketone, which comprises contacting the unsaturated compound with hydrogen cyanide at a temperature of from —25° C. to 200° C. in the presence of a metal complex having the formula [L$_n$MX$_m$]$_b$;

wherein M is a metal selected from the group consisting of Ni, Co, Pd, Fe, Cu, Mo and W, wherein L is a sigma-pi bonding neutral ligand of the group consisting of CO and PZ$_3$, and is PZ$_3$ when M is Ni and the unsaturated organic compound is a monoolefin substituted with cyano;

wherein Z is selected from the class consisting of R and OR and R is selected from the class consisting of alkyl and aryl groups having up to 18 carbonn atoms, wherein the R groups in a given PZ$_3$ may be cojoined and may be the same or different;

wherein X is selected from the group consisting of halide and cyanide, and b has a numerical value of 1–3;

wherein n has a numerical value of 3–4 and m is 4–n when M is Ni, Co or Pd;

wherein n is 6 and m is zero when M is Mo or W;

wherein n has a numerical value of 2–5 and the sum of n and m is a value of 4–5 when M is Fe;

wherein n is zero, m has a numerical value of 1–2 and and X is halide when M is Cu;

wherein the molar ratio of the unsaturated organic compound to the metal complex is from about 1:2 to about 2000:1; and recovering an organic nitrile derived from the unsaturated organic compound by addition of hydrogen cyanide to the ethylenic carbon-carbon unsaturation thereof; the improvement which comprises carrying out the hydrocyanation with an organic cyanohydrin of an aliphatic, cycloaliphatic or aromatic ketone or aldehyde as the source of hydrogen cyanide.

2. The process of claim 1 wherein the cyanohydrin is selected from the group consisting of acetone cyanohydrin and cyclohexanone cyanohydrin.

3. The process of claim 2 wherein M is nickel.

4. The process of claim 3 wherein Z of PZ$_3$ is OR and R is aryl.

5. The process of claim 3 wherein Z of PZ$_3$ is R and R is aryl.

6. The proces of claim 1 wherein M is cobalt.

7. The process of claim 1 wherein M is palladium.

8. The process of claim 1 wherein there is present in addition to the compound of structure [L$_n$MX$_m$]$_b$, a compound of structure PX$_3$, wherein X is defined as in claim 9, the molar ratio of PX$_3$ to [L$_n$MX$_m$]$_b$ being at least 2:1.

9. The process of claim 1 wherein the unsaturated compound is selected from the group consisting of butadiene 3-pentenenitrile, 4-pentenenitrile and 2-methyl-3-butenenitrile.

10. The process of claim 1 wherein the process is effected by charging a reactor with the unsaturated compound, a cyanohydrin as defined in claim 1 and a compound of a metal of the group consisting of nickel, cobalt and palladium, the metal being in the form selected from the class consisting of (a) an organometallic compound and a sigma-pi bonding neutral ligand as defined in claim 1 (b) a compound of a metal having a valence greater than +1 and a reducing agent and (c) a compound of cobalt having a valence less than +1 and an oxidizing agent.

References Cited

UNITED STATES PATENTS

| | | | |
|---|---|---|---|
| 3,496,215 | 2/1970 | Drinkard et al. | 260—465.8 |
| 3,496,217 | 2/1970 | Drinkard, Jr., et al. | 260—465.3 |
| 3,496,218 | 2/1970 | Drinkard | 260—465.3 |
| 3,522,288 | 7/1970 | Drinkard, Jr., et al. | 260—465.3 |
| 3,542,847 | 11/1970 | Drinkard, Jr., et al. | 260—465.3 X |
| 3,551,474 | 12/1970 | Drinkard, Jr., et al. | 260—465.8 R |
| 3,564,040 | 2/1971 | Downing et al. | 260—465.8 R |

OTHER REFERENCES

Migrdichian, "The Chemistry of Organic Cyanogen Compounds," 1947, pp. 173–176.

JOSEPH P. BRUST, Primary Examiner

U.S. Cl. X.R.

260—464, 465, 465.1, 465.4, 465.8